US006965563B1

(12) United States Patent
Hospodor et al.

(10) Patent No.: US 6,965,563 B1
(45) Date of Patent: Nov. 15, 2005

(54) RESOURCE RESERVATION SYSTEM IN A COMPUTER NETWORK TO SUPPORT END-TO-END QUALITY-OF-SERVICE CONSTRAINTS

(75) Inventors: Andrew D. Hospodor, Los Gatos, CA (US); Michael K. Eneboe, San Jose, CA (US)

(73) Assignee: Western Digital Ventures, Inc., Lake Forest, CA (US)

(*) Notice: Subject to any disclaimer, the term of this patent is extended or adjusted under 35 U.S.C. 154(b) by 726 days.

(21) Appl. No.: 09/678,177

(22) Filed: Sep. 28, 2000

(51) Int. Cl.[7] .............................................. H04L 12/26
(52) U.S. Cl. ...................... 370/231; 360/72.1; 711/154
(58) Field of Search .............................. 370/231, 351, 370/352, 412, 413, 422; 360/70, 71, 72.1, 360/75; 707/1, 200; 711/4, 154, 100, 156, 711/163, 170, 111, 112, 113, 114; 713/1

(56) References Cited

U.S. PATENT DOCUMENTS

| | | | |
|---|---|---|---|
| 5,581,703 A | | 12/1996 | Baugher et al. |
| 5,600,638 A | * | 2/1997 | Bertin et al. ................. 370/351 |
| 5,668,897 A | * | 9/1997 | Stolfo ......................... 382/283 |
| 5,790,522 A | * | 8/1998 | Fichou et al. ............... 370/236 |
| 6,434,631 B1 | * | 8/2002 | Bruno et al. .................... 710/6 |
| 6,438,630 B1 | | 8/2002 | DeMoney |
| 6,631,130 B1 | * | 10/2003 | Roy et al. .................... 370/352 |
| 6,725,456 B1 | * | 4/2004 | Bruno et al. ................. 718/102 |

OTHER PUBLICATIONS

Alistair Croll and Eric Packman, "Managing Bandwidth—Deploying QOS in Enterprise Networks", Prentice Hall, Upper Saddle River, NJ, pp. 14-15, 217-305, 1999.

Jose Duato, Sudhakar Yalamanchili, Lionel Ni, "Interconnection Networks An Engineering Approach", IEEE Computer Society Press, pp. 35-106, 1997, ISBN: 0-8186-7800-3.

InfiniBand Architecture Release 0.9, vol. 1—General Specifications, pp. 47-51; Mar. 31, 2000.

D. D. Kandlur, K. G. Shin, D. Ferrari, "Real-Time Communication in Multihop Networks", IEEE Transactions on Parallel and Distributed Systems, vol. 5, No. 10, pp. 1044-1056, Oct. 1994.

W.C. Lee, M.G. Hluchi, and P.A. Humblet, "Routing Subject to Quality of Service Constraints in Integrated Communication Networks", IEEE Network, pp. 46-55, Jul./Aug. 1995.

(Continued)

*Primary Examiner*—Chau Nguyen
*Assistant Examiner*—Joshua Kading
(74) *Attorney, Agent, or Firm*—Howard H. Sheerin, Esq.

(57) ABSTRACT

A computer network is disclosed comprising a plurality of interconnected computer devices including a plurality of disk drives for storing network data, each disk drive comprising a head and a disk. The computer network comprises a plurality of interconnected nodes, and a reservation facility for reserving resources within the disk drives and the nodes to support a predetermined Quality-of-Service constraint with respect to data transmitted between the disk drives through the nodes of the computer network. In one embodiment, a switched node is disclosed comprising switching circuitry having more than two bi-directional ports for simultaneously transmitting data in multiple dimensions through a computer network, a disk for storing data, a head actuated over the disk for writing data to and reading data from the disk, and a reservation facility for reserving resources associated with data read from the disk and written to the disk to support the predetermined Quality-of-Service constraint with respect to data transmitted through the computer network.

39 Claims, 7 Drawing Sheets

OTHER PUBLICATIONS

J. Rexford, J. Hall, K. G. Shin, "A Router Architecture for Real-Time Communication in Multicomputer Networks", IEEE Transactions on Computers, vol. 47, No. 10, pp. 1088-1101, Oct. 1998.

J. Rexford, J. Dolter and K. G. Shin, "Hardware Support for Controlled Interaction of Guaranteed and Best-Effort Communication", Proceedings of the Workshop on Parallel and Distributed Real-Time Systems, pp. 188-193, Apr. 1994.

D.D. Kandlur and K.G. Shin, "Traffic Routing for Multi-Computer Networks with Virtual Cut-Through Capability", Proc. 10th Int. Conf. Distributed Computing Systems, 1990, pp. 398-405.

J. Rexford and K. G. Shin, "Support for Multiple Classes of Traffic in Multicomputer Routers", Proceedings of the Workshop on Parallel Computer Routing and Communication, pp. 116-130, May 1994.

* cited by examiner

RESOURCE RESERVATION SYSTEM IN A COMPUTER NETWORK TO SUPPORT END-TO-END QUALITY-OF-SERVICE CONSTRAINTS

BACKGROUND OF THE INVENTION

1. Field of the Invention

The present invention relates to computer networks. More particularly, the present invention relates to a resource reservation system in a computer network to support end-to-end Quality-of-Service constraints.

2. Description of the Prior Art

Quality-of-Service (QOS) typically refers to a predetermined minimum latency and minimum data transfer rate supported by a computer network. Point-to-Point QOS is typically implemented within prior art networks by reserving resources through a path from the source node to the destination node (see the Resource Reservation Protocol or RSVP an overview for which is provided in the text book *Managing Bandwidth—Deploying QOS in Enterprise Networks*, by Alistair Croll and Eric Packman, Prentice Hall, Upper Saddle River, N.J., 1999; and "Resource Reservation Protocol (RSVP)—Version 1 Functional Specification", Braden, R., Zhang, L., Berson, S., Herzog, S., Jamin, S., RFC 2205, September 1997, Proposed Standard). Reserving resources throughout the transmission path guarantees that the connection will support a desired QOS for a specified period. Implementing QOS constraints requires knowledge of the resources in each node and the connection between the nodes in the network including the transmission latencies and bandwidth.

Consider, for example, the prior art computer network 2 shown in FIG. 1. When client computer 4B attempts to access a data stream stored on a disk drive 6 attached to network server 8, a transmission path 10 through nodes 16a and 16b may be established by reserving the necessary resources at each node to support predetermined QOS constraints such as latency and data rate. During the life of the reserved transmission path 10, nodes 16a and 16b may be inaccessible by other client computers (e.g., client computer 4C) if either node lacks the resources to handle additional traffic.

Because the mechanical latency of the disk drive 6 is not taken into account in the QOS equation, the network server 8 will typically buffer a sufficient amount of the data stream so that the mechanical latency of the disk drive 6 does not impact the QOS constraints. However, this implementation may require a significant amount of buffer memory and processing power at the network server 8 in order to support multiple, simultaneous streams. Further, for certain business transactions, such as bidding on auctions over a network, the QOS constraints could be on the order of milliseconds. In such applications it may become impractical or even impossible to satisfy the QOS constraints due to the mechanical latencies of the disk drives responsible for servicing the transaction data.

There is, therefore, a need to reduce the complexity and cost of implementing QOS constraints in a computer network, particularly with respect to the mechanical latencies of disk storage devices. In particular, there is a need to support QOS constraints on the order of milliseconds in transactions executed over a computer network.

SUMMARY OF THE INVENTION

The present invention may be regarded as a switched node comprising switching circuitry having more than two bi-directional ports for simultaneously transmitting data in multiple dimensions through the computer network, a disk for storing data, a head actuated over the disk for writing data to and reading data from the disk, and a reservation facility for reserving resources associated with data read from the disk and written to the disk to support a predetermined Quality-of-Service constraint with respect to data transmitted through the computer network.

In one embodiment, the resources reserved by the reservation facility comprise memory for buffering data within the switched node.

In another embodiment, the reservation facility limits movement of the head so as to constrain the head to a predetermined region of the disk, thereby reserving a resource within the switched node.

In yet another embodiment, the switching circuitry comprises a plurality of virtual lanes and the resources comprise at least one of the virtual lanes.

The present invention may also be regarded as method of reserving resources in a computer network to support a predetermined Quality-of-Service constraint with respect to a new access request to transmit data between a disk drive and a client computer, the computer network comprising a plurality of interconnected computer devices including a plurality of disk drives, each disk drive comprising a head and a disk. The method comprises the steps of finding at least one disk drive out of the plurality of disk drives that can service the new access request while supporting the Quality-of-Service constraint for the new and existing access requests, and reserving resources within the at least one disk drive to service the new access request. The present invention may also be regarded as a computer network comprising a plurality of interconnected computer devices including a plurality of client computers and a plurality of disk drives for storing network data, each disk drive comprising a head and a disk. The computer network comprises a plurality of interconnected nodes, and a reservation facility for reserving resources within the disk drives and the nodes to support a predetermined Quality-of-Service constraint with respect to data transmitted between the disk drives and the client computers through the nodes of the computer network.

The present invention may also be regarded as a computer network comprising a plurality of interconnected computer devices including a plurality of disk drives for storing network data, each disk drive comprising a head and a disk. The computer network comprises a plurality of interconnected nodes, and a reservation facility for reserving resources within the disk drives and the nodes to support a predetermined Quality-of-Service constraint with respect to data transmitted between the disk drives through the nodes of the computer network.

The present invention may also be regarded as a switched fabric computer network comprising a plurality of interconnected nodes for simultaneously transmitting data in multiple dimensions through the computer network. Each node comprises switching circuitry comprising more than two bi-directional ports, a disk for storing data, and a head actuated over the disk for writing data to and reading data from the disk. The switched fabric computer network further comprises a reservation facility for reserving resources associated with data read from the disk and written to the disk to support a predetermined Quality-of-Service constraint with respect to data transmitted between the interconnected nodes and client computers connected to the switched fabric computer network.

DESCRIPTION OF THE PREFERRED EMBODIMENTS

Figure 1:
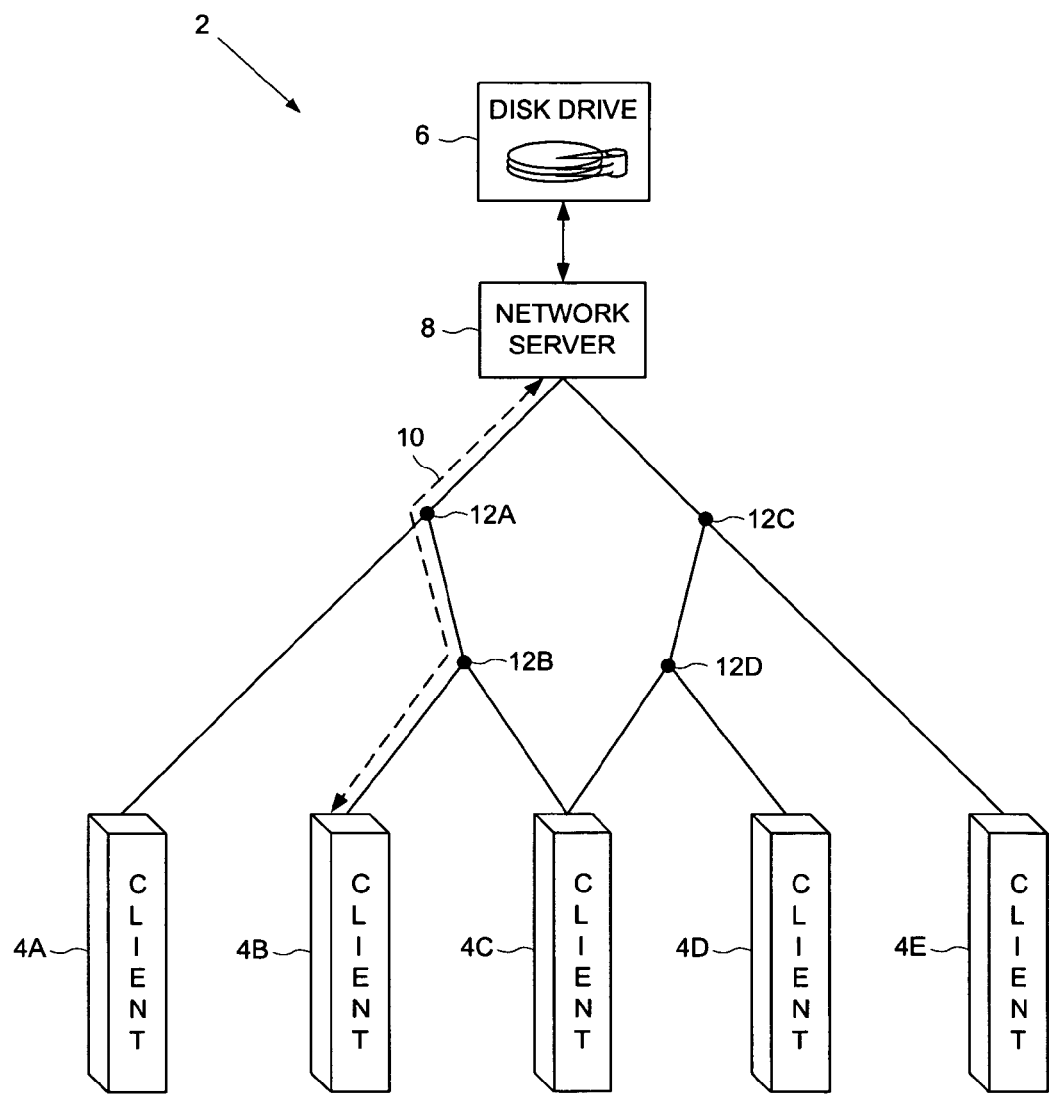
FIG. 1 shows a prior art a computer network wherein a path is established between a client computer and a network server by reserving resources at each node to support a predetermined QOS constraint.
Figure 2:
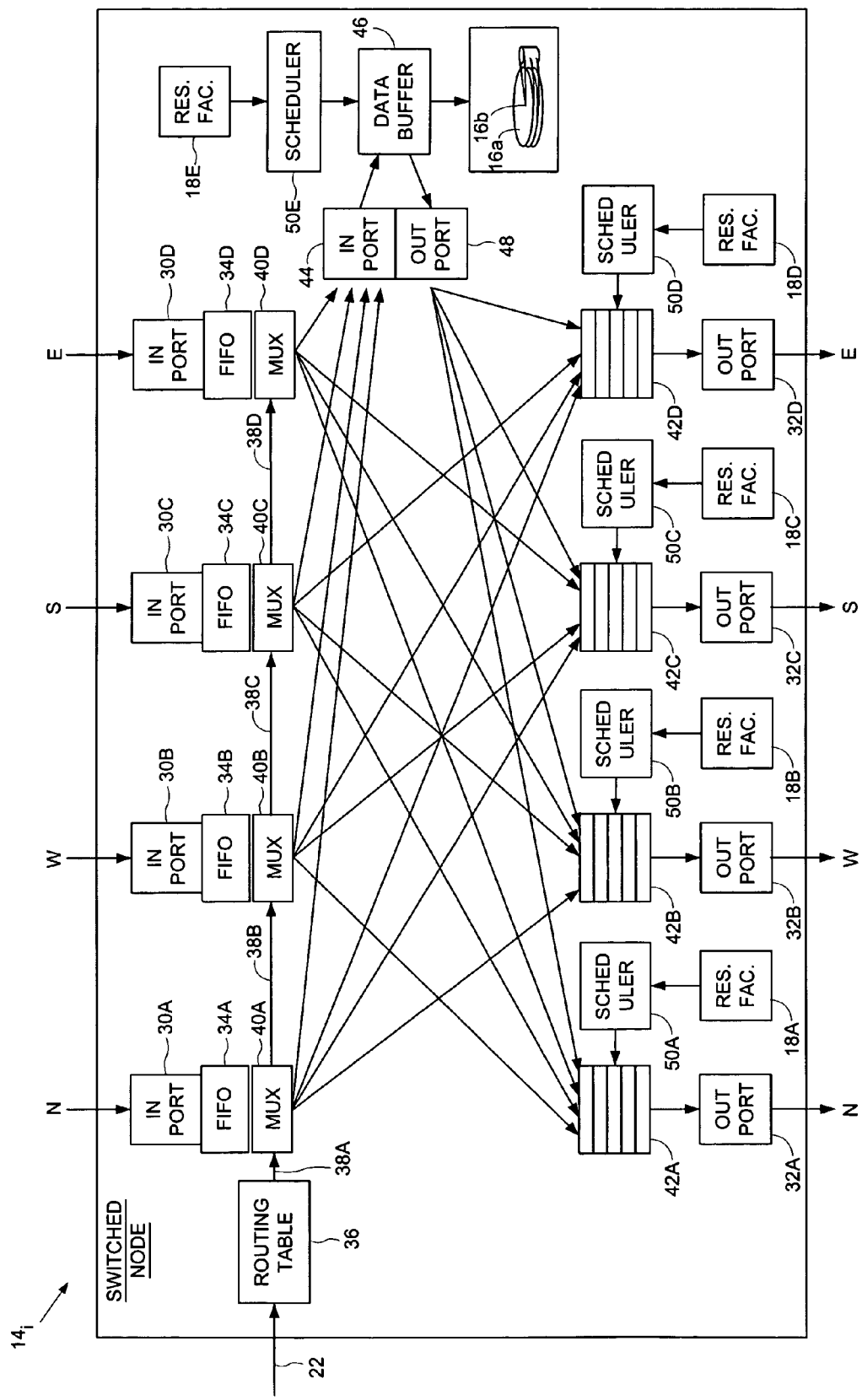
FIG. 2 shows details of the switched node according to an embodiment of the present invention comprising a disk, a head, and a reservation facility for reserving resources associated with the disk and head.

FIG. 2 shows a switched node $14_i$ according to an embodiment of the present invention. The switched node $14_i$ comprises switching circuitry having more than two bi-directional ports for simultaneously transmitting data in multiple dimensions through the computer network, a disk 16a for storing data and a head 16b actuated over the disk 16a for writing data to and reading data from the disk 16a, and a reservation facility 18A–18E for reserving resources associated with data read from the disk 16a and written to the disk to support a predetermined Quality-of-Service constraint with respect to data transmitted through the computer network.

In contrast to the prior art techniques for supporting Point-to-Point QOS constraints by reserving resources at the nodes in a path between two entities in a network, the embodiment of FIG. 2 supports End-to-End QOS constraints by reserving resources at the end of the path (i.e., at the disk drive) as well as at the nodes through the path. In an embodiment described below, a path is established between two disk drives connected to the network and resources are reserved at both ends of the path (i.e., at both disk drives) as well as at the nodes in the path between the disk drives.

Figure 3:
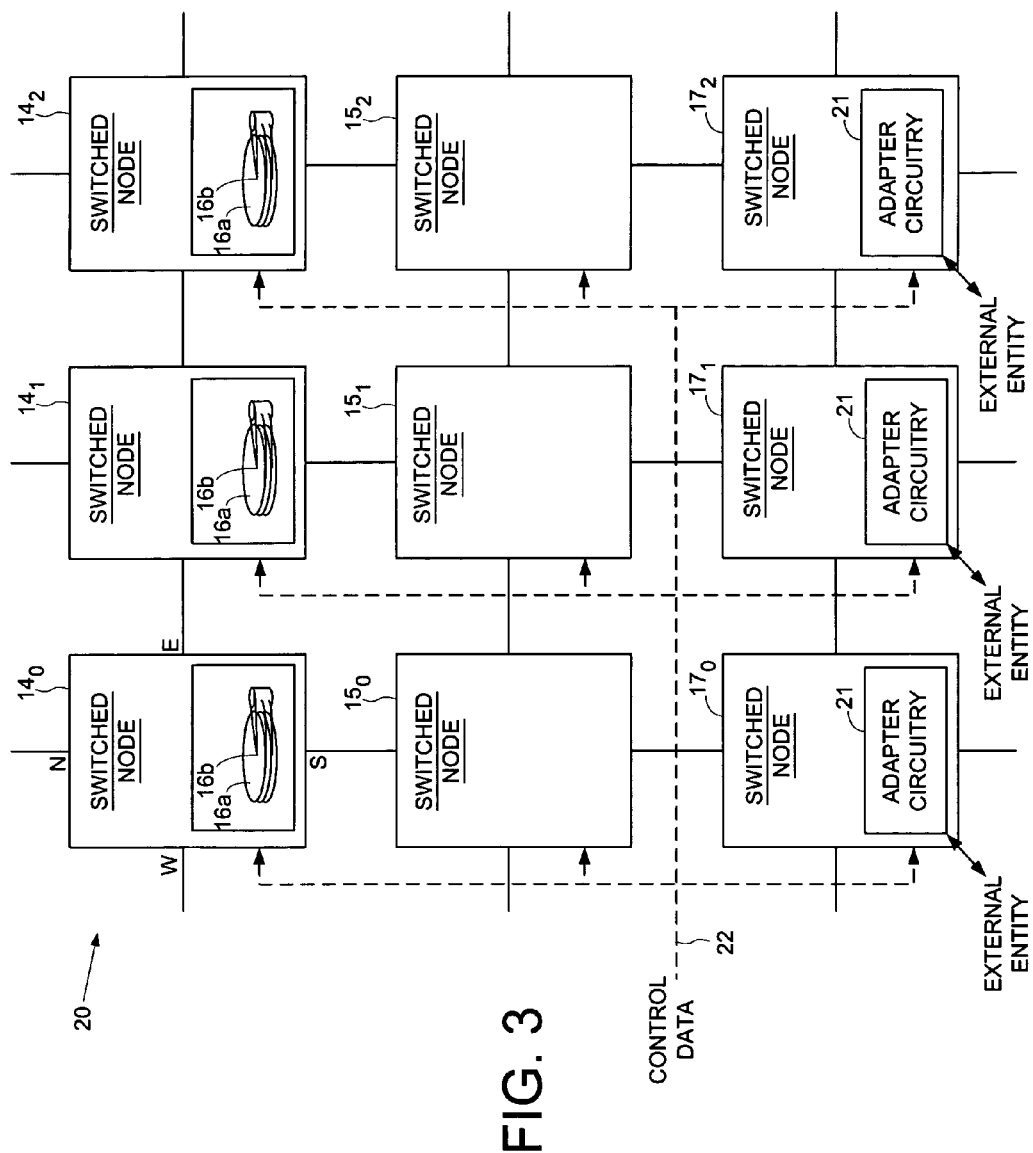
FIG. 3 shows a two dimensional switched fabric comprising a plurality of switched nodes, including switched nodes comprising a disk, a head, and switched nodes comprising adapter circuitry for connecting to an external entity.

The switched node of FIG. 2 is interconnected with a plurality of other switched nodes 20 such as shown in FIG. 3 to form a multi-dimensional switched fabric. Each of the switched nodes in FIG. 3 comprises four bi-directional ports (North, East, South and West) forming a two-dimensional fabric. Control data 22 is generated by a switched fabric microprocessor, such as the microprocessor 24 in the switched fabric network 26 shown in FIG. 4. In one embodiment, the network data transmitted through the switched nodes 20 consist of packets having a packet header comprising routing data which identifies the destination node for the packet. The packets are buffered in buffers $28_0$–$28_N$, and the microprocessor 24 processes the packet header in order to route the packet through the switched nodes 20. A suitable routing algorithm implemented by the microprocessor 24 of FIG. 4 generates control data 22 for configuring the switched nodes 20. Any suitable routing algorithm may be employed, and it may support Unicast, Multicast, or Broadcast delivery mechanisms. The routing decisions may be made centrally, at the source, distributed, or multiphase, implemented using a lookup table or using a finite-state machine. Further, the routing algorithm may be deterministic or adaptive. A discussion of various routing algorithms which may be employed in the embodiments of the present invention is provided by Jose Duato et al. in the text book "Interconnection Networks, an Engineering Approach", IEEE Computer Society, 1997.

The routing algorithm is implemented a layer "above" the switching layer, and thus the routing algorithm may be compatible with various different switching algorithms, for example, Virtual Cut-Through Switching, Wormhole Switching, and Mad Postman Switching. In addition, topologies other than the two-dimensional switched fabric of FIG. 3, as well as topologies comprising more than two dimensions, may be employed in the present invention by decreasing or increasing the number of bi-directional ports per switched node. Various els topologies and switching algorithms which may be employed in the embodiments of the present invention are discussed in the aforementioned textbook by Jose Duato et al.

In the embodiment shown in FIG. 3, the switched nodes 20 constituting the switched fabric suitably comprise processing circuitry and memory to facilitate the routing, scheduling and resource reservation operations. In addition, the switched nodes 20 may or may not comprise a disk 16a and a head 16b. Also in the embodiment of FIG. 3, a select number of the switched nodes 20 comprise adapter circuitry 21 for connecting to an external entity (e.g., a client computer in FIG. 4). In the example of FIG. 3, switched nodes $14_0$–$14_2$ comprise a disk 16a and a head 16b as shown in FIG. 2, switched nodes $15_0$–$15_2$ comprise the circuitry shown in FIG. 2 without the disk 16a and head 16b, and switched nodes $17_0$–$17_2$ comprise adapter circuitry 21 for connecting to an external entity and may or may not comprise a disk 16a and a head 16b. In another embodiment, a selected number of the switched nodes (e.g., $15_0$–$15_2$) comprise a microprocessor for implementing a distributed routing algorithm.

Referring again to FIG. 2, the bi-directional ports of the switched node $14_i$ comprise four input ports 30A–30D and four output ports 32A–32D corresponding to the North, East, South and West ports shown in FIG. 3. Data packets received from the input ports 30A–30D are buffered in FIFO buffers 34A–34D. A routing table 36 is configured by the control data 22 generated by the microprocessor 24 of FIG. 4. The routing table 36 generates control signals 38A–38D which configure multiplexers 40A–40D in order to route the data packets to appropriate data buffers 42A–42D associated with the output ports 32A–32D. In this manner, the data packets cross the switched node $14_i$ immediately except for the delay of the FIFO buffer 34A–34D. The FIFO buffers 34A–34D provide buffering of input data in the event that the target data buffer 42 is full or busy receiving data from another of the input ports.

The data packets may also be routed to an input port 44 associated with the disk 16a and the head 16b and stored in data buffer 46, wherein the data stored in data buffer 46 is ultimately written onto the disk 16a. Data read from the disk 16a is also stored in the data buffer 46 and transmitted via output port 48 to the appropriate data buffer 42A–42D.

A scheduling facility 50A–50E is also provided within the switched node 14; which schedules the time when the data packets are to be transferred from the data buffers 42A–42D to the output ports 32A–32D, and when data packets are transferred to and from the disk 16a. In one embodiment, the timing information for the packets are stored in the packet headers and processed by the scheduling facility 50A–50E. In one embodiment, the timing information implements an isochronous communication protocol such as disclosed in the in Texas Instruments' TSB12LV41A link-layer controller (LLC) which supports the IEEE 1394 specification for high-performance serial bus with automatic generation of the common isochronous packet headers and time stamping as required by the IEC 61883 standard.

In one embodiment, the data buffers 42A–42D comprise a plurality of virtual lanes where each virtual lane is assigned a predetermined priority level. The scheduling facility 50A–50D schedules the data packets according to the timing information by queuing the data packets in the appropriate virtual lanes. For example, data packets with shorter transmission deadlines are queued in higher priority virtual lanes, whereas data packets with longer transmission deadlines are queued in lower priority virtual lanes. In addition, within a virtual lane the data packets can be queued in order of arrival (FIFO) or in order of departure based on the transmission deadlines in order to support predetermined QOS constraints. Details of departure queuing are disclosed by Jennifer Rexford, et al. in "A Router Architecture for Real-Time Communication in Multicomputer Networks", *IEEE Transactions on Computers*, Vol. 47, No. 10, October 1998, which is incorporated herein by reference.

In the embodiment of FIG. 2, the reservation facility 18A–18D within the switched node $14_i$ reserves resources associated with the scheduling facility 50A–50D to support predetermined QOS constraints for data transmitted through the switch node $14_i$, and reservation facility 18E reserves resources associated with the scheduling facility 50E to support predetermined QOS constraints for data transmitted to and from the disk 16a. The scheduling facility 50E also comprises additional resources for implementing the interface between the data buffer 46 and the disk 16a.

In one embodiment, the reservation facility 18A–18D reserves a virtual lane to support predetermined QOS constraints with respect to data transferred through the switched node 14i. In another embodiment, the reservation facility 18A–18D reserves processing circuitry within the switched switch node $14_i$ for implementing the routing and scheduling operations. In yet another embodiment, the switched switch node $14_i$ comprises circuitry for linking the output ports 32A–32D to input ports 30A–30D of other switched nodes, the linking circuitry has limited bandwidth, and the reservation facility 18A–18D reserves at least part of the linking circuitry bandwidth to support predetermined QOS constraints. In still another embodiment, the reservation facility 18A–18D reserves at least part of the adapter circuitry 21 shown FIG. 3 to support predetermined QOS constraints.

In another embodiment, the reservation facility 18E reserves memory within the data buffer 46 to support writing a data stream to the disk 16a or to support reading a data stream from the disk 16a. In yet another embodiment, the reservation facility 18E limits movement of the head 16b with respect to the disk 16a so as to constrain the head 16b to a predetermined region of the disk 16a, thereby reserving a resource within the switched node $14_i$.

The switched node of $14_i$ of FIG. 2 can be extended to add additional dimensionality by duplicating the circuitry associated with each bi-directional port (input port 30, FIFO 34, MUX 40, output port 32, etc.). In one embodiment, the switched switch node $14_i$ is a commodity device which comprises a facility for dynamically configuring the bi-directional ports to support a desired switched fabric topology. Thus, a number of the input ports 30A–30D and/or a number of the output ports 32A–32D may be configured to connect to ports of other switched nodes, whereas the remaining ports may be left unconnected.

Figure 5:
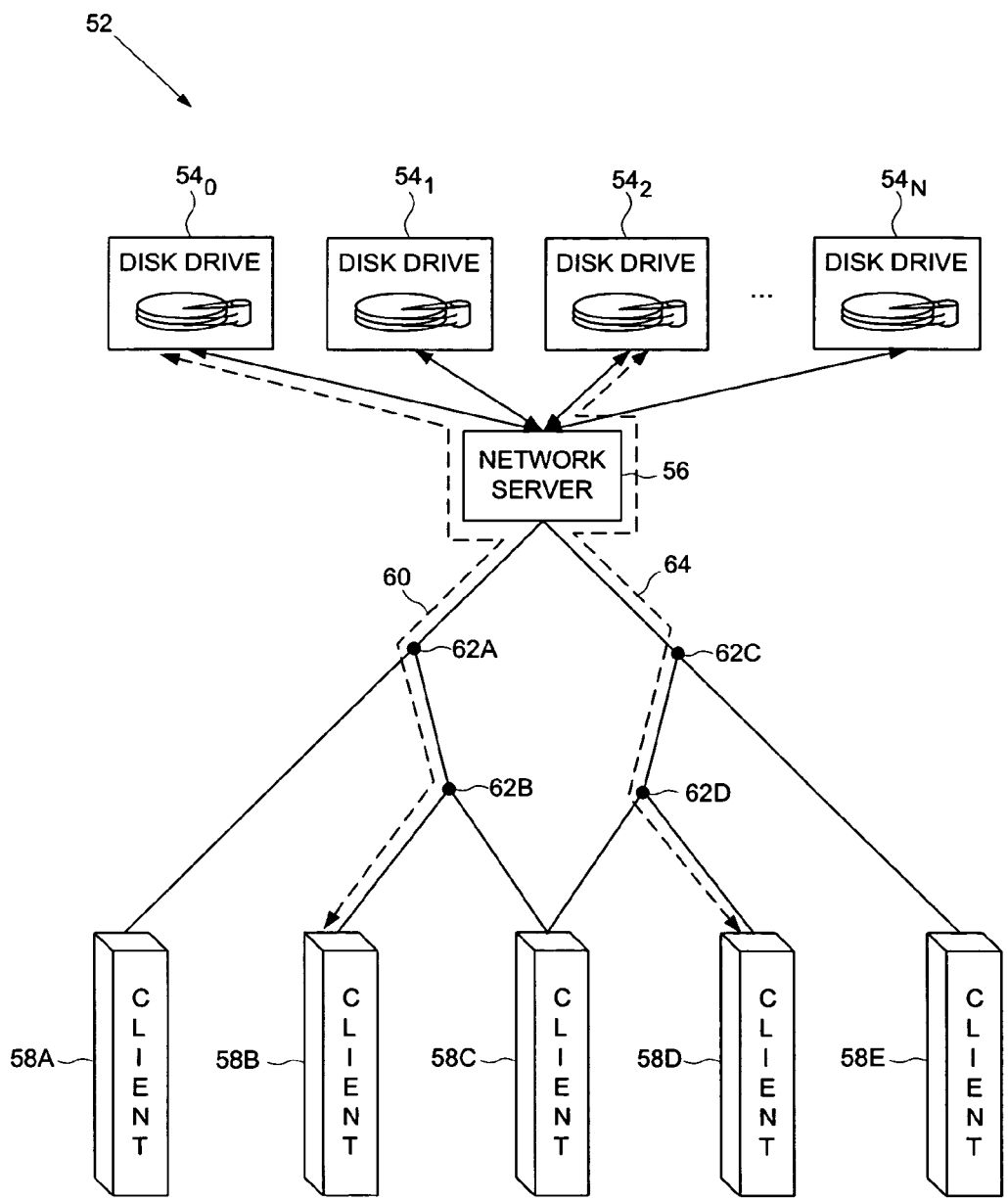
FIG. 5 shows a computer network according to an embodiment of the present invention wherein a path is established between a client computer and a disk drive connected to a network server by reserving resources at each node as well as within the disk drive to support a predetermined QOS constraint.

FIG. 5 shows a computer network 52 according to another embodiment of the present invention wherein a plurality of disk drives $54_0$–$54_N$ are employed by a network server 56 to implement a network storage system. In one embodiment, each disk drive $54_i$ stores a mirrored copy of network data such that the data can be retrieved by a client from any one of the disk drives $54_0$–$54_N$. Each disk drive $54_i$ comprises a reservation facility for reserving resources within the disk drive $54_i$ to support predetermined QOS constraints. For example, when client 58B requests data stored in the network storage system, a path 60 is established by reserving appropriate resources in nodes 62A and 62B, in the network server 56, and finally in disk drive $54_0$. If client 58D simultaneously requests access to data stored in the network storage system, a path 64 is established by reserving resources in nodes 62C and 62D, in the network server 56, and in a disk drive other than disk drive $54_0$ (e.g., disk drive $54_2$) since disk drive $54_0$ may not have sufficient resources available to service the request for client 58D as well as the request for client 58B.

In one embodiment, the network server 56 sends a client's request to each of the disk drives $54_0$–$54_N$ looking for a disk drive with sufficient resources to service the request. For example, when the network server 56 receives the request from client 58D, it first sends the request to disk drive $54_0$. Disk drive $54_0$ transmits a message back to the network server 56 indicating that the request cannot be serviced due to the drive's resources having already been reserved to support path 60 established for the access request from client 58B. The network server 56 then sends the request to disk drive $54_1$ and ultimately to disk drive $54_2$ which is able to service the request. In another embodiment, the network server 56 multicasts the request to the disk drives $54_0$–$54_N$ and then selects from the disk drives which can service the request.

Figure 6:
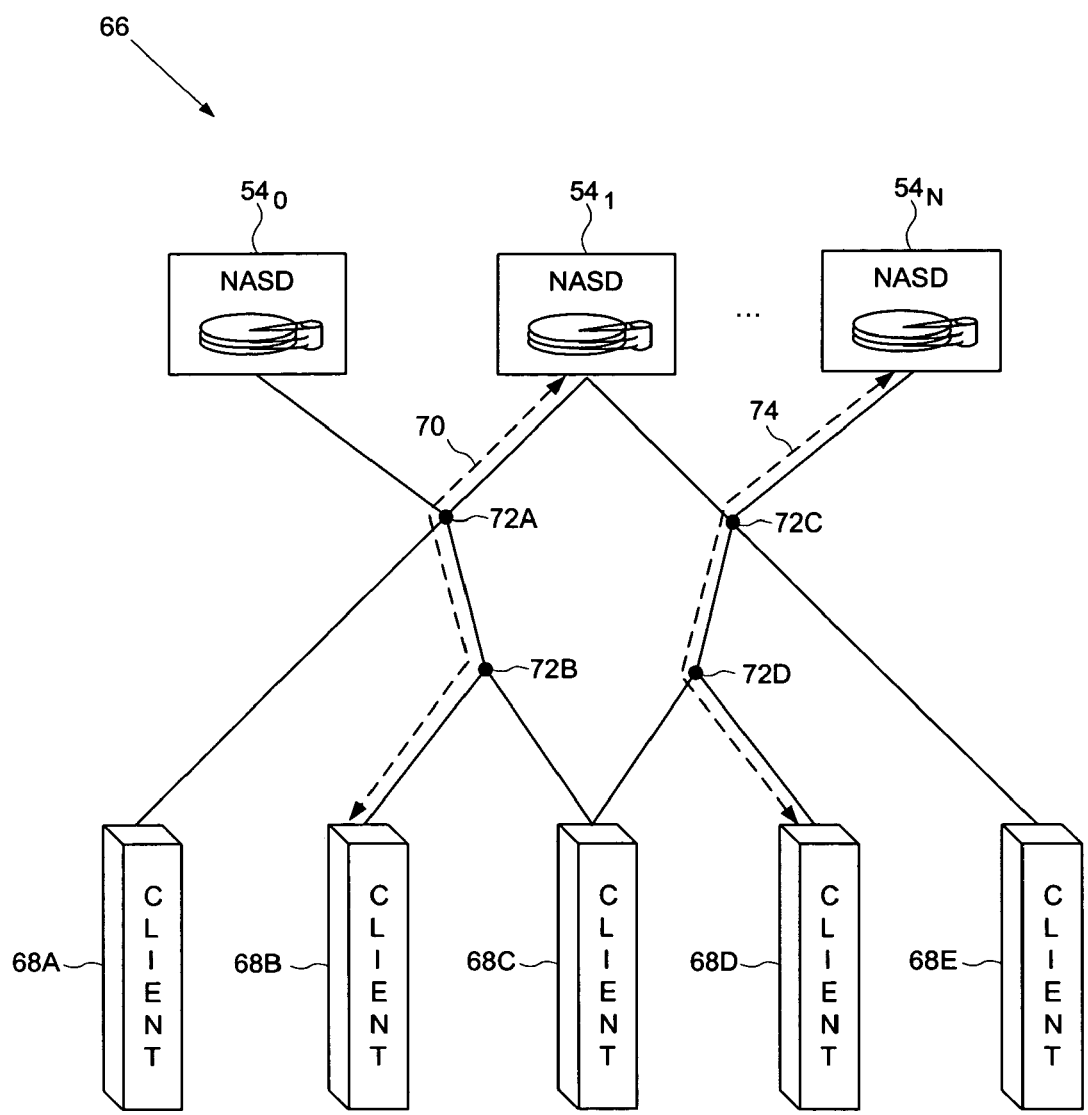
FIG. 6 shows a computer network according to an embodiment of the present invention wherein a path is established between a client computer and a network attached storage device (NASD) by reserving resources at each node as well as within the NASD to support a predetermined QOS constraint.

FIG. 6 shows a computer network 66 according to another embodiment of the present invention wherein the disk drives $54_0$–$54_N$ of FIG. 5 are implemented as network attached storage devices (NASD) comprising network communication circuitry for connecting directly to the network rather than through a network server 56 as in FIG. 5. In FIG. 6, client 68B is accessing the network storage system through path 70 established by reserving resources in nodes 72A and 72B as well as in NASD disk drive $54_1$. A simultaneous access request by client 68D is serviced through path 74 by reserving resources in nodes 72C and 72D as well as in NASD disk drive $54_N$.

In one embodiment, the access requests from the clients are sent to each NASD disk drive $54_0$–$54_N$ until one is found that has sufficient resources to service the request. For example, if in FIG. 6 the request from client 68D was first sent to NASD disk drive $54_1$, NASD disk drive 54, would transmit a message to node 72C indicating that it could not service the request due to the resources already reserved for client 68B. Node 72C would then send the request to NASD disk drive $54_N$ which would reply with a message indicating that it has sufficient resources to service the request.

In another embodiment, a path is reserved between two disk drives. For example, disk drive $54_0$ connected to the network server 56 or connected directly to the network (NASD) may establish a path with another disk drive connected to the network (e.g., a disk drive connected to client computer 58A or another NASD drive connected directly to the network, such as NASD disk drive $54_1$). Resources are reserved within both disk drives, thereby supporting End-to-End QOS constraints.

Figure 7:
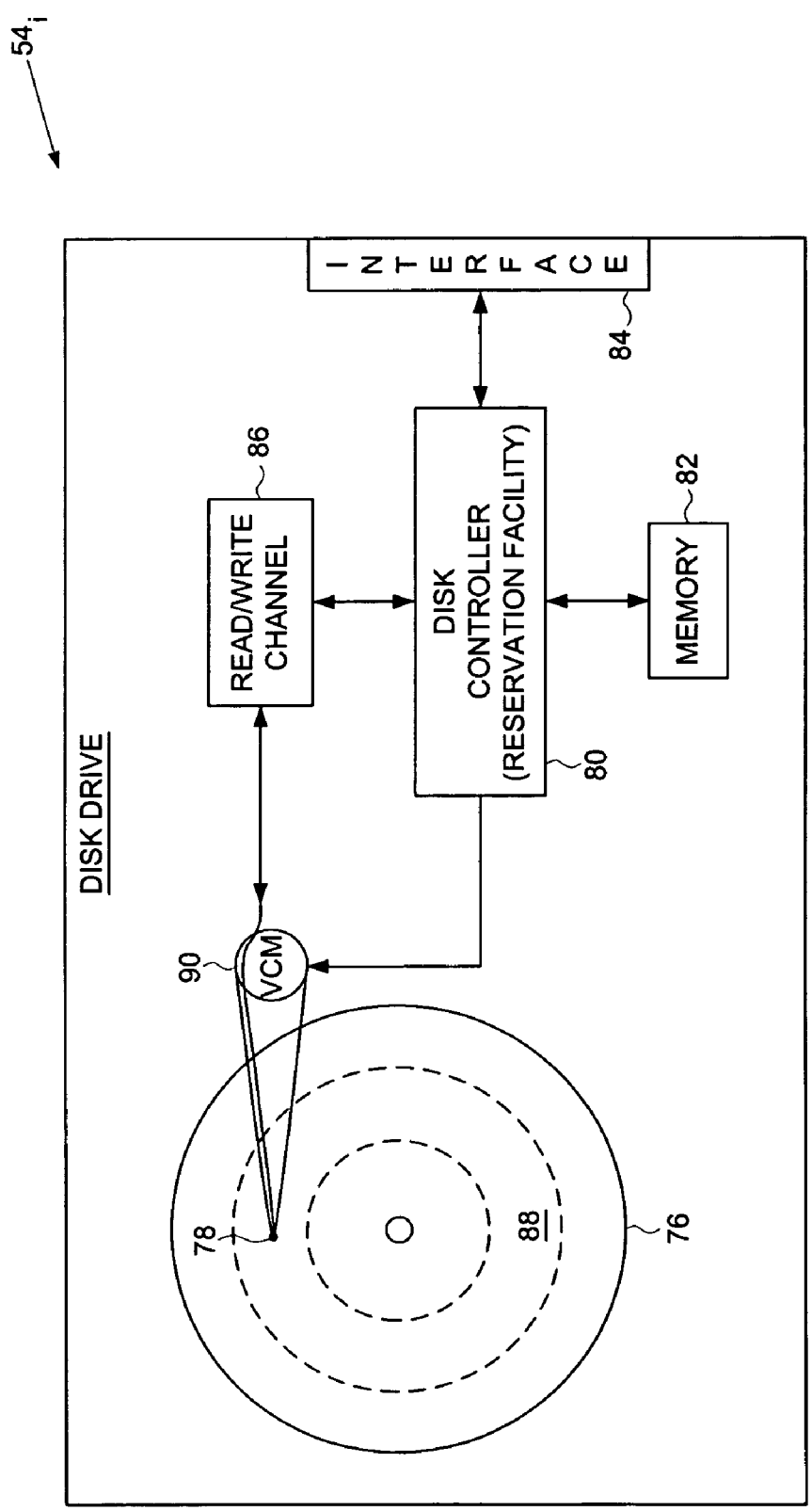
FIG. 7 shows details of a disk drive according to an embodiment of the present invention including a disk controller for reserving resources within the disk drive to support a predetermined QOS constraint.

FIG. 7 shows a disk drive $54_i$ for communicating with a client computer or with another disk drive through a computer network, such as the computer network of FIG. 5 or FIG. 6. The disk drive $54_i$ comprises a disk 76 for storing data, a head 78 actuated over the disk 76 for writing data to and reading data from the disk 76, and a disk controller 80 for controlling access to the disk 76, wherein the disk controller 80 comprises a reservation facility for reserving resources within the disk drive $54_i$ to support predetermined QOS constraints with respect to data transmitted between the disk drive $54_i$ and the client computer through the computer network.

In one embodiment, the resources reserved by the reservation facility comprise memory 82 for buffering data within the disk drive $54_i$. For example, when transmitting a data stream from the client computer to the disk drive $54_i$, data received via the disk drive's interface 84 is stored in the memory 82 before being written to the disk 76. The disk controller 80 reserves a sufficient amount of memory 82 to ensure that the data flowing from the interface 84 is not interrupted for a sustained period so as to guarantee a Quality-of-Service with respect to the data received from the client computer. In one embodiment, the disk drive $54_i$ reserves a sufficient amount of memory 82 to service the client's request as well as other requests in an interleaved manner. Thus, while the disk drive $54_i$ is servicing another request, data associated with the client's request is buffered in the memory 82.

The disk controller 80 evaluates a queue of access requests, as well as the current capacity for the memory 82, to determine whether the client's request can be serviced. If the client's request cannot be serviced, the disk drive $54_i$ transmits a message to this effect to an external entity (e.g., to a network server or to a node in a network). If the client's request can be serviced, then the disk drive $54_i$ begins to store the client's data in the reserved area of the memory 82. The disk controller 80 then reads the client's data from the memory 82, performs appropriate data formatting (e.g., error correction code (ECC) encoding), and then writes the formatted data to the disk 76 via a read/write channel 86. The read/write channel 86 is also employed to read data from the disk drive wherein the ECC coding is used to detect and correct errors induced by the recording process.

In another embodiment, the reservation facility within the disk controller 80 limits movement of the head 78 so as to constrain the head 78 to a predetermined region 88 of the disk 76, thereby reserving a resource within the disk drive $54_i$. In one embodiment, the predetermined region 88 is defined by a predetermined number of concentric tracks recorded on the disk 76 and centered about a predetermined radial location. For example, if a client's data stream is to be written to a particular track, then the reservation facility may limit movement of the head 78 so as to prevent the head 78 from deviating excessively from the data stream's track. This limits the seek time to the data stream's track in order to satisfy the QOS constraints. In other words, if the disk drive $54_i$ is servicing another request, the seek time to return the head 78 to the data stream's track will always be within a known threshold which ensures that the QOS constraints are satisfied with respect to the client's request to write the data stream to the disk 76.

In one embodiment, the disk controller 80 comprises suitable servo control facilities for controlling a voice coil motor (VCM) 90 which actuates the head 78 over the disk 76. The disk controller 80 limits movement of the head 78 through the servo control facilities, that is, by evaluating client requests as well as pending requests and then controlling the VCM 90 so as to prevent the head 78 from deviating outside of the predetermined region 88.

Resources within the disk drive $54_i$ may also be reserved to facilitate client requests to read data from the disk 76. For example, the data rate of the disk drive $54_i$ for any particular data stream may depend on the amount of memory 82 reserved for that data stream, where the memory 82 requirement increases as the desired data rate increases. This may be due, for example, to the error correction capabilities of the disk controller 80. Thus, the disk controller 80 evaluates the desired data rate for a client's requests, together with pending requests, to determine whether the disk drive $54_i$ has sufficient resources to satisfy the request. If so, the disk controller 80 reserves a sufficient amount of memory 82 to service the request; otherwise, the disk drive $54_i$ notifies an external entity as to the inability to service the request.

Limiting the head 78 to a predetermined region on the disk 76 may also facilitate transferring a data stream from the disk 76 to a client computer while satisfying predetermined QOS constraints. Similar to a write operation, limiting movement of the head 78 limits the seek time to ensure that the head 78 can return to a particular data track within a known period. That is, it ensures the disk controller 80 can return the head 78 to a particular data track after servicing a current access request.

In one embodiment, the resources reserved by the reservation facility include network communication circuitry within the disk drive $54_i$ for use in communicating with the computer network. For example, the disk drive $54_i$ of FIG. 7 may comprise network communication circuitry for implementing an isochronous protocol, wherein at least part of this circuitry is reserved when a path is established for a client request. Suitable circuitry for implementing an isochronous protocol is disclosed in Texas Instruments' TSB12LV41A link-layer controller (LLC) which supports the IEEE 1394 specification for high-performance serial bus with automatic generation of the common isochronous packet headers and time stamping as required by the IEC 61883 standard.

Figure 4:
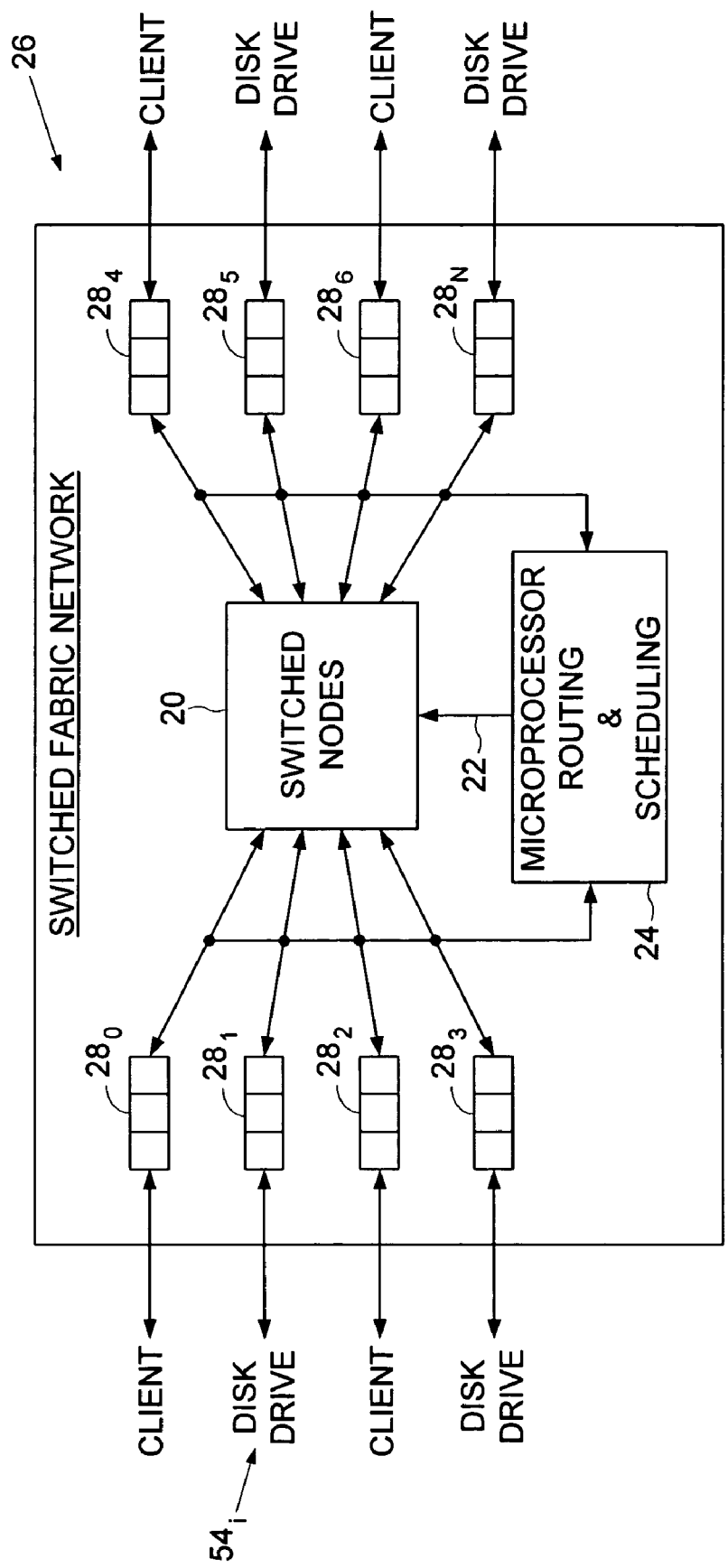
FIG. 4 shows a switched fabric computer network according to an embodiment of the present invention wherein a path is established between a client and a disk drive by reserving resources in the switched nodes of a switched fabric as well as in the disk drive.

In one embodiment, the disk drive $54_i$ of FIG. 7 is attached to a switched fabric computer network 26 as illustrated in FIG. 4. In this embodiment, the reservation facility will reserve resources in a path through the switched nodes 20 as well as resources within the disk drive $54_i$ in order to support QOS constraints for a client computer attached to the switched fabric computer network 26. The disk drive $54_i$ as well as the client computer may be attached to the edge of the switched fabric computer network 26, or they may be attached to an internal switched node through adapter circuitry 21 as shown in FIG. 3.

We claim:

1. A switched node for use in a computer network comprising:
    (a) switching circuitry comprising more than two bidirectional ports for simultaneously transmitting data in multiple dimensions through the computer network;
    (b) a disk for storing data and a head actuated over the disk for writing data to and reading data from the disk; and
    (c) a reservation facility for reserving resources for reading data from the disk and writing data to the disk to support a predetermined Quality-of-Service constraint with respect to data transmitted through the computer network,
wherein the reservation facility limits movement of the head so as to constrain the head to a predetermined region of the disk, thereby reserving a resource within the switched node.

2. The switched node of claim 1, wherein the resources comprise memory for buffering the data read from the disk and written to the disk.

3. The switched node of claim 1, wherein the switching circuitry comprises a plurality of virtual lanes and the resources comprise at least one of the virtual lanes.

4. The switched node of claim 3, wherein each virtual lane comprises a predetermined priority level.

5. The switched node of claim 3, wherein the transmitted data is queued within each virtual lane in order of arrival into the switched node.

6. The switched node of claim 3, wherein the transmitted data is queued within each virtual lane with respect to transmission deadlines associated with the transmitted data.

7. The switched node of claim 1, wherein the switching circuitry comprises processing circuitry and the resources comprise at least part of the processing circuitry.

8. The switched node of claim 1, wherein:
    (a) the switching circuitry comprises linking circuitry for linking to a plurality of other switched nodes in the computer network;
    (b) the linking circuitry comprises a limited bandwidth; and
    (c) the resources comprise at least part of the linking circuitry bandwidth.

9. The switched node of claim 1, wherein:
    (a) the switching circuitry comprises adapter circuitry for connecting to an external entity; and
    (b) the resources comprise at least part of the adapter circuitry.

10. A method of reserving resources in a computer network to support a predetermined Quality-of-Service constraint with respect to a new access request to transmit data between a disk drive and a client computer, the computer network comprising a plurality of interconnected computer devices including a plurality of disk drives, each disk drive comprising a head and a disk, the method comprising the steps of:
    (a) finding at least one disk drive out of the plurality of disk drives that can service the new access request while supporting the Quality-of-Service constraint for the new and existing access requests; and
    (b) reserving resources within the at least one disk drive to service the new access request,
wherein the step of reserving resources comprises the step of limiting movement of the head so as to constrain the head to a predetermined region of the disk.

11. The method of reserving resources as recited in claim 10, wherein the resources comprise memory for buffering the transmitted data.

12. The method of reserving resources as recited in claim 10, wherein the resources comprise network circuitry for communicating with the computer network.

13. The method of reserving resources as recited in claim 12, wherein:
    (a) the network circuitry comprises multi-port switching circuitry for simultaneously transmitting the transmitted data in multiple dimensions through the computer network; and
    (b) the resources comprise a virtual lane within the multi-port switching circuitry.

14. The method of reserving resources as recited in claim 13, wherein each virtual lane comprises a predetermined priority level.

15. The method of reserving resources as recited in claim 13, wherein the transmitted data is queued within each virtual lane in order of arrival into the switched node.

16. The method of reserving resources as recited in claim 13, wherein the transmitted data is queued within each virtual lane with respect to transmission deadlines associated with the data.

17. The method of reserving resources as recited in claim 13, wherein the multi-port switching circuitry comprises processing circuitry and the resources comprise at least part of the processing circuitry.

18. The method of reserving resources as recited in claim 13, wherein:
    (a) the multi-port switching circuitry comprises linking circuitry for linking a plurality of nodes in the computer network;
    (b) the linking circuitry comprises a limited bandwidth; and
    (c) the resources comprise at least part of the linking circuitry bandwidth.

19. The method of reserving resources as recited in claim 13, wherein:
    (a) the multi-port switching circuitry comprises adapter circuitry for connecting to an external entity; and
    (b) the resources comprise at least part of the adapter circuitry.

20. A computer network comprising:
    (a) a plurality of interconnected computer devices including a plurality of client computers and a plurality of disk drives for storing network data, each disk drive comprising a head and a disk;
    (b) a plurality of interconnected nodes; and
    (c) a reservation facility for reserving resources within the disk drives and the nodes to support a predetermined Quality-of-Service constraint with respect to data transmitted between the disk drives and the client computers through the nodes of the computer network,
wherein the reservation facility limits movement of the head so as to constrain the head to a predetermined region of the disk thereby reserving a resource within the disk drive.

21. The computer network of claim 20, wherein the resources comprise memory for buffering transmitted data.

22. The computer network of claim 20, wherein the resources comprise network circuitry for communicating with the computer network.

23. The computer network of claim 22, wherein:
    (a) the network circuitry comprises multi-port switching circuitry for simultaneously transmitting the transmitted data in multiple dimensions through the computer network; and (b) the resources comprise a virtual lane within the multi-port switching circuitry.

24. The computer network of claim 23, wherein the transmitted data is queued within each virtual lane in order of arrival into the switched node.

25. The computer network of claim 23, wherein the transmitted data is queued within each virtual lane with respect to transmission deadlines associated with the data.

26. The computer network of claim 23, wherein the multi-port switching circuitry comprises processing circuitry and the resources comprise at least part of the processing circuitry.

27. The computer network of claim 23, wherein:
(a) the multi-port switching circuitry comprises linking circuitry for linking the nodes in the computer network;
(b) the linking circuitry comprises a limited bandwidth; and
(c) the resources comprise at least part of the linking circuitry bandwidth.

28. The computer network of claim 23, wherein:
(a) the multi-port switching circuitry comprises adapter circuitry for connecting to an external entity; and
(b) the resources comprise at least part of the adapter circuitry.

29. The computer network of claim 20, wherein each node comprises multi-port switching circuitry for simultaneously transmitting the transmitted data in multiple dimensions through the computer network.

30. A computer network comprising:
(a) a plurality of interconnected computer devices including a plurality of disk drives for storing network data, the disk drives each comprising a head and a disk;
(b) a plurality of interconnected nodes; and
(c) a reservation facility for reserving resources within the disk drives and the nodes to support a predetermined Quality-of-Service constraint with respect to data transmitted between the disk drives through the nodes of the computer network,
wherein the reservation facility limits movement of the head so as to constrain the head to a predetermined region of the disk, thereby reserving a resource within the node.

31. A switched fabric computer network comprising:
(a) a plurality of interconnected nodes for simultaneously transmitting data in multiple dimensions through the computer network, each node comprising:
switching circuitry comprising more than two bi-directional ports;
a disk for storing data; and
a head actuated over the disk for writing data to and reading data from the disk;
(b) a reservation facility for reserving resources associated with reading data from the disk and writing data to the disk to support a predetermined Quality-of-Service constraint with respect to data transmitted between the interconnected nodes and client computers connected to the switched fabric computer network; and
(c) a scheduling facility, responsive to the resources reserved by the reservation facility, for scheduling the transmission of the transmitted data through the interconnected nodes to support the predetermined Quality-of-Service constraint.

32. The switched fabric computer network of claim 31, wherein the resources comprise memory for buffering the transmitted data.

33. The switched fabric computer network of claim 31, wherein the resources comprise network circuitry for communicating with the switched fabric computer network.

34. The switched fabric computer network of claim 31, wherein:
(a) the switching circuitry comprises a plurality of virtual lanes; and
(b) the resources comprise at least one of the virtual lanes.

35. The switched fabric computer network of claim 34, wherein the transmitted data is queued within each virtual lane in order of arrival into the switched node.

36. The switched fabric computer network of claim 34, wherein the transmitted data is queued within each virtual lane with respect to transmission deadlines associated with the data.

37. The switched fabric computer network of claim 31, wherein the switching circuitry comprises processing circuitry and the resources comprise at least part of the processing circuitry.

38. The switched fabric computer network of claim 31, wherein:
(a) the switching circuitry comprises linking circuitry for linking to a plurality of other switched nodes in the computer network;
(b) the linking circuitry comprises a limited bandwidth; and
(c) the resources comprise at least part of the linking circuitry bandwidth.

39. The switched fabric computer network of claim 31, wherein:
(a) the switching circuitry comprises adapter circuitry for connecting to an external entity; and
(b) the resources comprise at least part of the adapter circuitry.

* * * * *